United States Patent
Bessho et al.

(10) Patent No.: US 10,557,462 B2
(45) Date of Patent: Feb. 11, 2020

(54) MAGNETIC FLUID DRIVE UNIT AND MAGNETIC FLUID DRIVING METHOD

(71) Applicants: TOYOTA JIDOSHA KABUSHIKI KAISHA, Toyota-shi, Aichi-ken (JP); THE DOSHISHA, Kyoto-shi, Kyoto (JP)

(72) Inventors: Takeshi Bessho, Toyota (JP); Haruhiko Yamasaki, Kyotanabe (JP); Hiroshi Yamaguchi, Kyotanabe (JP)

(73) Assignees: TOYOTA JIDOSHA KABUSHIKI KAISHA, Toyota-shi, Aichi-ken (JP); THE DOSHISHA, Kyoto-shi, Kyoto (JP)

( * ) Notice: Subject to any disclaimer, the term of this patent is extended or adjusted under 35 U.S.C. 154(b) by 302 days.

(21) Appl. No.: 15/673,581

(22) Filed: Aug. 10, 2017

(65) Prior Publication Data
US 2018/0100492 A1 Apr. 12, 2018

(30) Foreign Application Priority Data
Oct. 7, 2016 (JP) ................. 2016-199212

(51) Int. Cl.
| | |
|---|---|
| F04B 19/00 | (2006.01) |
| F01N 3/04 | (2006.01) |
| F28D 15/02 | (2006.01) |
| F01N 3/02 | (2006.01) |
| F04B 17/03 | (2006.01) |

(Continued)

(52) U.S. Cl.
CPC ............ *F04B 19/006* (2013.01); *C09K 5/048* (2013.01); *F01N 3/0205* (2013.01); *F01N 3/043* (2013.01); *F01N 5/02* (2013.01); *F04B 17/03* (2013.01); *F04B 19/24* (2013.01); *F04F 1/18* (2013.01); *F01N 2240/05* (2013.01); *F01N 2260/024* (2013.01); *Y02T 10/16* (2013.01); *Y02T 10/20* (2013.01)

(58) Field of Classification Search
CPC ........ F04B 19/006; F04B 19/24; F04B 17/03; F04F 1/18
USPC ....................................... 417/48, 50
See application file for complete search history.

(56) References Cited

U.S. PATENT DOCUMENTS

| | | | | |
|---|---|---|---|---|
| 3,616,645 | A | * 11/1971 | Van Der Voort | ....... F01K 27/00 60/682 |
| 2006/0110262 | A1* | 5/2006 | Hsu | .......................... F04B 19/24 417/208 |

(Continued)

FOREIGN PATENT DOCUMENTS

| | | |
|---|---|---|
| CN | 1995898 A | 7/2007 |
| JP | 2014-050140 A | 3/2014 |
| JP | 2014-134335 A | 7/2014 |

*Primary Examiner* — Charles G Freay
(74) *Attorney, Agent, or Firm* — Sughrue Mion, PLLC

(57) ABSTRACT

A magnetic fluid drive unit 100 having a double tube 10 comprising an inner tube 11 and an outer tube 12 formed on the outer side of the inner tube 11, and a magnetic field applicator 30 installed on the outer side of the double tube 10, the inner tube 11 having, in the region where a magnetic field is applied by the magnetic field applicator 30, a high heat conducting region 21 and a low heat conducting region 22 aligned in the lengthwise direction of the inner tube 11, the inside of the inner tube 11 being a heating medium flow path, and the area between the inner tube 11 and the outer tube 12 being a magnetic fluid flow path.

5 Claims, 6 Drawing Sheets

(51) Int. Cl.
*F04F 1/18* (2006.01)
*F04B 19/24* (2006.01)
*C09K 5/04* (2006.01)
*F01N 5/02* (2006.01)

(56) References Cited

U.S. PATENT DOCUMENTS

| | | | | |
|---|---|---|---|---|
| 2006/0278373 | A1* | 12/2006 | Hsu | H01L 23/473 165/104.33 |
| 2007/0071611 | A1* | 3/2007 | Martin | F02M 27/045 417/48 |
| 2008/0264068 | A1* | 10/2008 | Nakasuka | F28D 15/0266 62/3.3 |
| 2010/0200566 | A1* | 8/2010 | Komino | C23C 16/46 219/444.1 |
| 2011/0037325 | A1* | 2/2011 | Ciocanel | F04F 99/00 310/11 |
| 2013/0192682 | A1* | 8/2013 | Freese | F16L 55/00 137/13 |
| 2014/0360928 | A1* | 12/2014 | Holland | C02F 1/487 210/209 |
| 2019/0214173 | A1* | 7/2019 | Ramanujan | F25B 21/00 |

\* cited by examiner

MAGNETIC FLUID DRIVE UNIT AND MAGNETIC FLUID DRIVING METHOD

FIELD

The present invention relates to a magnetic fluid drive unit and to a magnetic fluid driving method.

BACKGROUND

Magnetic fluid drive units are known that comprise a heating section and a magnetic field applicator in a flow path encapsulating a magnetic fluid (PTLs 1 and 2).

In magnetic fluid driven technology, a magnetic field is applied to magnetize a magnetic fluid, and a portion of the magnetized magnetic fluid is heated to lower the magnetization of the heated magnetic fluid. This produces a disproportion in the magnetic volume force acting on the magnetic fluid, allowing the magnetic fluid to be driven. A magnetic fluid typically contains magnetic fine particles such as iron oxide fine particles and a mother liquor in which the magnetic fine particles are dispersed, and if desired the magnetic fluid may further contain a low-boiling-point solvent having a lower boiling point than that of the mother liquor.

An example of a publicly known magnetic fluid drive unit is shown in FIG. 1.

In the magnetic fluid drive unit of FIG. 1(a), with the x position on the magnetic fluid flow path as the abscissa and magnetic field H as the ordinate, the magnetic field applicator ideally generates a magnetic field exhibiting an approximately trapezoid distribution with no polar inversion (FIG. 1(b)). When a magnetic field H is applied to a magnetic fluid, the magnetic fluid behaves as a fluid with magnetization M. Iron oxide fine particles behave in a super-paramagnetic manner at room temperature. Magnetization of a super-paramagnetic body obeys the Langevin function, and for low magnetic field ranges the magnetization can be approximated as being proportional to the magnetic field. The Curie temperature for iron oxide fine particles is 477K (204° C.), and their temperature-sensitive property is such that the magnetization falls with increasing temperature toward the Curie temperature T.

Thus, local magnetization M of a magnetic fluid is expressed by the following mathematical formula.

$$M = \mu_0 \chi (1-\alpha)\left(1 - \frac{T-T_0}{T_c - T_0}\right)H \quad \text{[Mathematical Formula 1]}$$

The symbols in the formula represent the following.
$\mu_0$: Vacuum permeability
$\chi$: Magnetic susceptibility
$\alpha$: Void percentage of magnetic fluid
T: Temperature of magnetic fluid at heating section
$T_0$: Temperature of magnetic fluid at non-heating section
$T_c$: Curie temperature of magnetic fine particles
H: Magnetic field In a magnetic fluid under a magnetic field H, a magnetic volume force F acts in direct proportion to the magnetization M and magnetic field gradient $\nabla H$ ($F=M\cdot\nabla H$). The magnetic volume force F undergoes a sign reversal bordering on the center of the magnetic field application site, when the position x on the magnetic fluid flow path is plotted on the abscissa and magnetic volume force F is plotted on the ordinate (FIG. 1(c)). The total driving force acting on a magnetic fluid is proportional to the volume of the area bounded by the curve of the magnetic volume force F and the abscissa x, as shown in FIG. 1(c).

At the stage prior to heating, balance between the magnetic volume force F1 in the right direction and the magnetic volume force F2 in the left direction in FIG. 1 prevents driving of the magnetic fluid ("(i) Before heating" in FIG. 1(c)).

When a portion of a magnetized magnetic fluid is heated by a heating section situated at one end of the magnetic field applicator in the magnetic fluid flow path, magnetization of the iron oxide particles at the heating section decreases as the temperature T increases, resulting in reduced magnetization M of the magnetic fluid. As a result, the magnetic volume force F2 of the heating section is smaller than the magnetic volume force F1 at the non-heating section, and consequently a driving force is produced in the right direction in FIG. 1, as the difference between F1 and F2. The magnetic fluid thus begins to be spontaneously driven in the right direction in FIG. 1 ("(ii) During heating (T<TL)" in FIG. 1(c)).

When the magnetic fluid contains the aforementioned low-boiling-point solvent, and the magnetic fluid is heated to a temperature of at least the boiling point TL of the low-boiling-point solvent and below the boiling point TH of the mother liquor, the low-boiling-point solvent gasifies, generating air bubbles inside the magnetic fluid. This also causes the void percentage a of the magnetic fluid to increase, further reducing the magnetization M of the heating section. Thus, the difference between the magnetic volume force F1 in the right direction in FIG. 1 and the magnetic volume force F2 in the left direction in FIG. 1 increases further, such that the total driving force in the right direction in FIG. 1 increases ("(iii) During heating (T≤TL<TH)" in FIG. 1(c)).

PTL 1 relates to technology in which the heating zone of the heating section in the magnetic fluid flow path is controlled to arbitrarily vary the driving direction and/or driving speed of the magnetic fluid, and/or the heat volume at the heating section in the magnetic fluid flow path is controlled to arbitrarily vary the driving speed of the magnetic fluid.

PTL 2 relates to technology using a permanent magnet to apply a magnetic field at a magnetic field applicator in a magnetic fluid flow path.

CITATION LIST

Patent Literature

[PTL 1] Japanese Unexamined Patent Publication No. 2014-134335
[PTL 2] Japanese Unexamined Patent Publication No. 2014-50140

DISCLOSURE OF THE INVENTION

Problems to be Solved by the Invention

These published documents describe electric heaters as heating means (heat sources) for heating sections for magnetic fluid driving technology. However, they contain no description for the manner of use when the heating means employed is a hot fluid flowing through a tube.

It is an object of the present invention to provide means for efficiently driving a magnetic fluid for heat transport, using a heating medium flowing through a tube as the heat source.

Means for Solving the Problems

The invention comprises the following technical means.

[1] A magnetic fluid drive unit having a double tube comprising an inner tube and an outer tube formed on the outer side of the inner tube, and a magnetic field applicator installed on the outer side of the double tube, the inner tube having, in the region where a magnetic field is applied by the magnetic field applicator, a high heat conducting region and a low heat conducting region aligned in the lengthwise direction of the inner tube, and the inside of the inner tube being a heating medium flow path and the area between the inner tube and the outer tube being a magnetic fluid flow path.

[2] A method of driving a magnetic fluid using a magnetic fluid drive unit according to [1], wherein a magnetic fluid is situated in a distributable manner between the inner tube and the outer tube, and a magnetic field is applied by the magnetic field applicator while distributing the heating medium on the inner side of the inner tube.

[3] The method according to [2], wherein the heating medium is an exhaust gas discharged from an internal combustion engine.

[4] A heat transport method in which, by driving a magnetic fluid by a method according to [2] or [3], the heat of the heating medium is transported.

Effect of the Invention

The magnetic fluid drive unit of the invention can distribute a heating medium in an inner tube to drive a magnetic fluid. By distributing the heating medium in an inner tube and situating the magnetic fluid between the inner tube and an outer tube, it is possible to increase the heat transfer area when heat of the heating medium is transferred to the magnetic fluid through the inner tube, and thus to efficiently transfer heat of the heating medium to the magnetic fluid.

In addition, since the magnetic fluid drive unit of the invention has a heat source in the inner tube, the distance between the magnetic field applicator and the heat source is longer and the magnetic field applicator is less affected by the heat from the heat source, providing the advantage of easier control of driving of the magnetic fluid.

BEST MODE FOR CARRYING OUT THE INVENTION

The magnetic fluid drive unit according to a preferred embodiment is a magnetic fluid drive unit having:

a double tube comprising an inner tube and an outer tube formed on the outer side of the inner tube, and a magnetic field applicator installed on the outer side of the double tube, the inner tube having, in the region where a magnetic field is applied by the magnetic field applicator, a high heat conducting region and a low heat conducting region aligned in the lengthwise direction of the inner tube, and the inside of the inner tube being a heating medium flow path and the area between the inner tube and the outer tube being a magnetic fluid flow path.

The method of driving a magnetic fluid according to a preferred embodiment is a method of driving a magnetic fluid using the aforementioned magnetic fluid drive unit wherein:

a magnetic fluid is situated in a distributable manner between the inner tube and the outer tube, and a magnetic field is applied by the magnetic field applicator while distributing the heating medium on the inner side of the inner tube.

The magnetic fluid drive unit of the preferred embodiment and the principle behind the method of driving a magnetic fluid using the unit will now be described with reference to the accompanying drawings.

Figure 1:
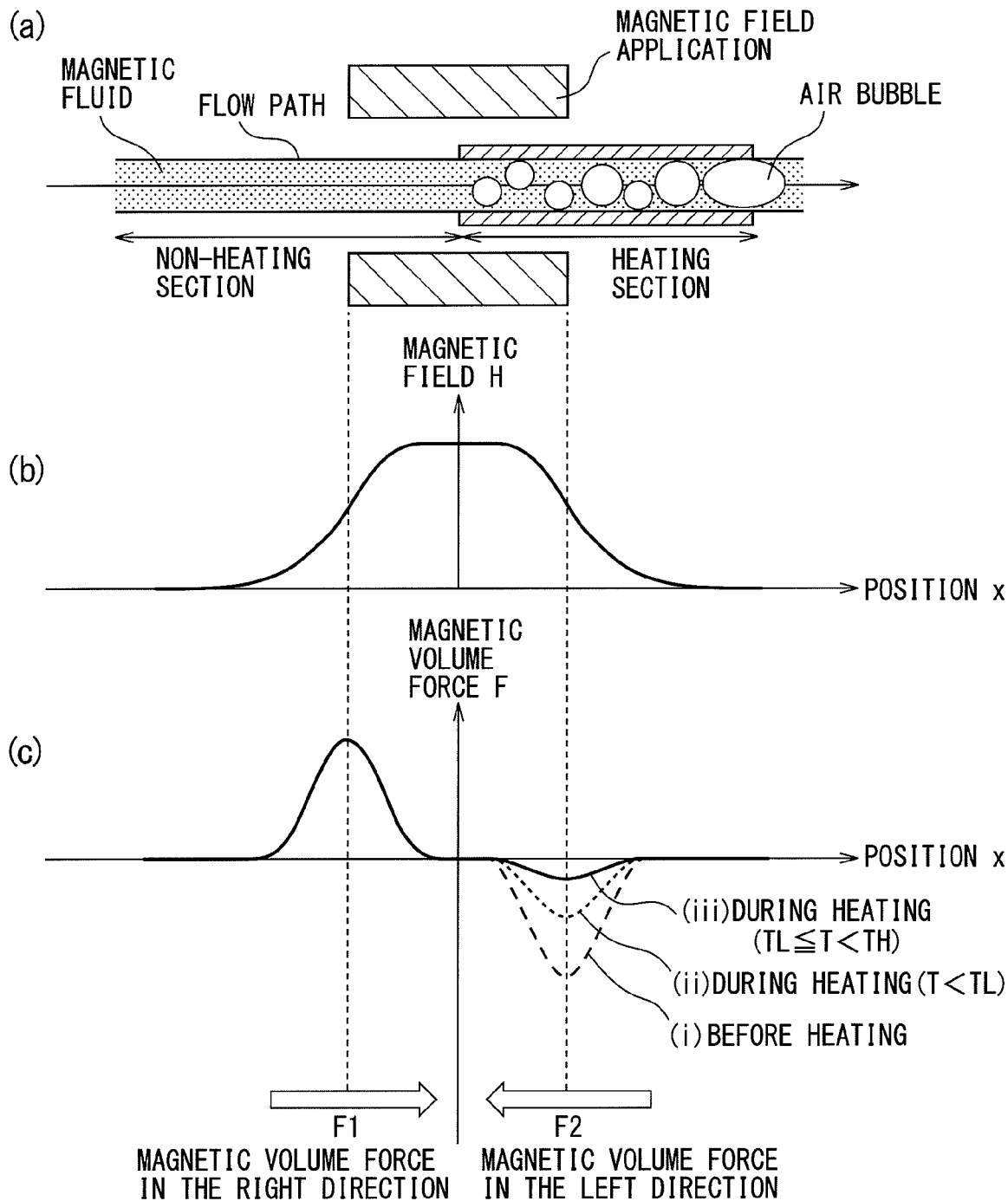
FIG. 1 is a conceptual drawing for illustration of the basic principle for magnetic fluid driving according to the prior art.
Figure 2:
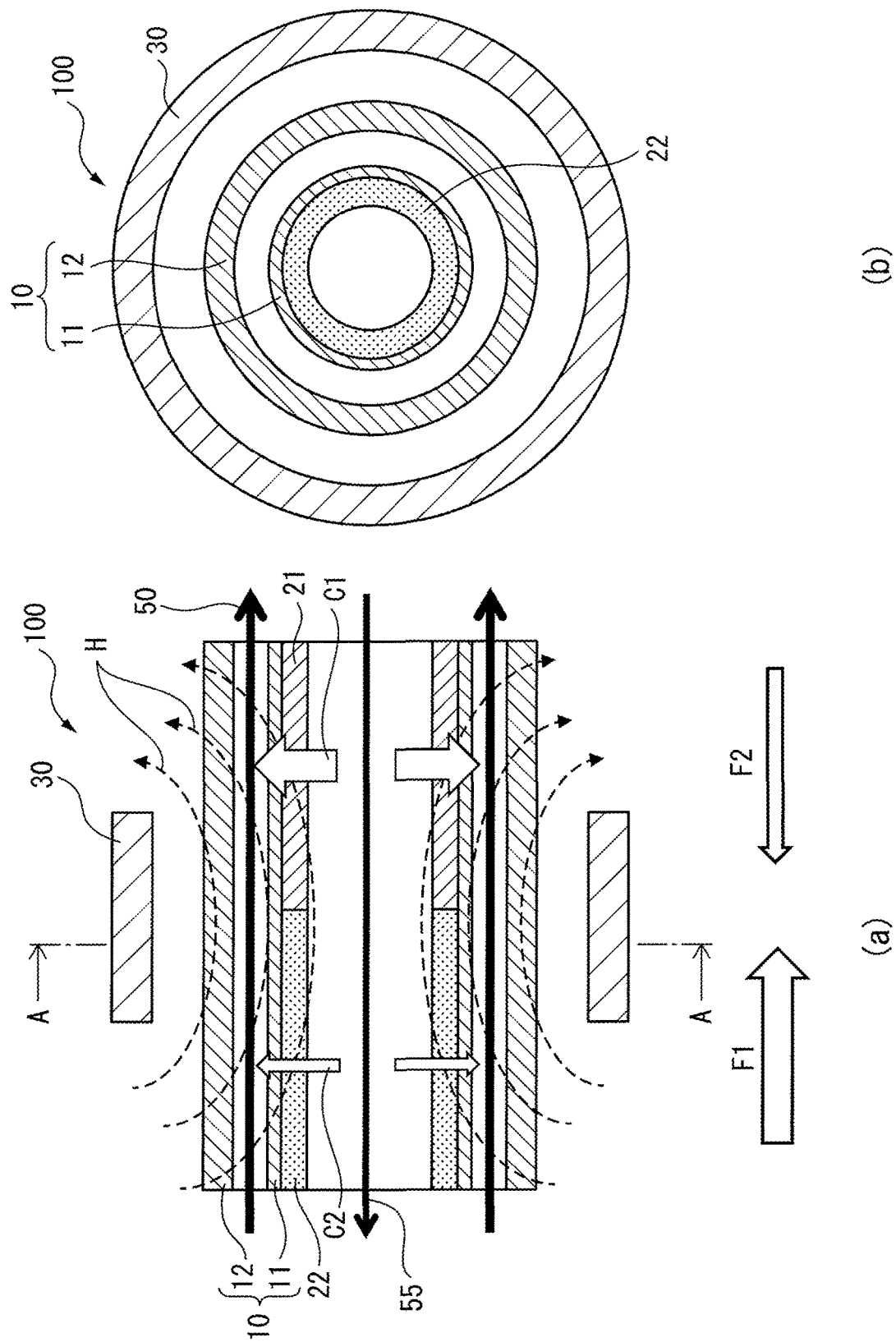
FIG. 2 is a simplified cross-sectional view for illustration of the structure of the magnetic fluid drive unit of the invention.

FIG. 2 is a schematic diagram for illustration of the structure of the magnetic fluid drive unit of the invention. FIG. 2(a) is a cross-sectional view of the magnetic fluid drive unit 100 cut on a face including the central axis, and FIG. 2(b) is a cross-sectional view along line A-A in FIG. 2(a).

The magnetic fluid drive unit 100 shown in FIG. 2 has a double tube 10 comprising an inner tube 11 and an outer tube 12, and a magnetic field applicator 30.

In the magnetic fluid drive unit 100 of FIG. 2, application of a magnetic field H by the magnetic field applicator 30 onto a magnetic fluid situated between the inner tube 11 and the outer tube 12 of the double tube 10 produces on the magnetic fluid a magnetic volume force F1 in the right direction of FIG. 2(a) and a magnetic volume force F2 in the left direction of FIG. 2(a), whose signs are inverted with the center of the magnetic field applicator 30 as the border. Before distribution of the heating medium, F1 and F2 are balanced and the magnetic fluid is not driven.

In this state, the heating medium is then distributed on the inner side of the inner tube 11 of the double tube 10. In FIG. 2(a), the heating medium flows from right to left in the drawing, as indicated by the arrow 55. The magnetic fluid is thermally in contact with the heating medium via the inner tube 11. The inner tube 11 has a high heat conducting region 21 and a low heat conducting region 22 (the low heat conducting region 22 can be seen on the cut surface of FIG. 2(b)). Therefore, heat transferred from the heating medium to the magnetic fluid differs between the regions, a large amount of heat C1 being supplied to the magnetic fluid in the high heat conducting region 21 and a small amount of heat C2 being supplied to the magnetic fluid in the low heat conducting region 22. Ideally, the magnetic fluid in the high heat conducting region 21 is heated by the heating medium, while the magnetic fluid in the low heat conducting region 22 is essentially not heated. This will cause only the magnetic fluid in the high heat conducting region 21 to increase in temperature toward the Curie temperature.

Moreover, since it causes a decrease in the magnetic volume force F2 in the left direction in FIG. 2(a) acting on the magnetic fluid in the high heat conducting region 21, the driving force acts in the right direction as the difference between the magnetic volume force F1 in the right direction and the magnetic volume force F2 in the left direction, and the magnetic fluid is driven from left to right in FIG. 2(a), as indicated by the arrow 50.

The magnetic fluid drive unit and magnetic fluid driving method of the invention, and their application, will now be explained with focus on a preferred embodiment (hereunder also referred to simply as "embodiment").

<Magnetic Fluid Drive Unit and Magnetic Fluid Driving Method>

[Double Tube]

The double tube in the magnetic fluid drive unit of the embodiment has an inner tube, and an outer tube formed on the outer side of the inner tube.

The materials composing the inner tube and the outer tube may be appropriately selected from among materials that do not react with the magnetic fluid and heating medium and have the strength to withstand the heat of the heating medium and driving of the magnetic fluid, and that also have a degree of thermal conductivity that will not impede transfer of the heat of the heating medium to the magnetic fluid in the high heat conducting region. Such materials include metals, for example, and specifically they may be appropriately selected from among, for example, gold, silver, copper, aluminum, stainless steel and brass.

The material composing the inner tube and the material composing the outer tube may be the same or different materials.

From the viewpoint of ensuring the cross-sectional area for the flow paths of the magnetic fluid and the heating medium inside the double tube, the outer diameter of the double tube (outer diameter of the outer tube) may be, for example, 50 mm or larger, 75 mm or larger, 100 mm or larger or 120 mm or larger. From the viewpoint of avoiding excessive bulk in the magnetic fluid drive unit, on the other hand, the outer diameter of the double tube may be, for example, no larger than 500 mm, no larger than 400 mm, no larger than 300 mm or no larger than 200 mm.

From the viewpoint of having strength that can withstand distribution of the magnetic fluid, the outer tube the wall thickness may be, for example, 1 mm or greater, 2 mm or greater, 3 mm or greater or 5 mm or greater. On the other hand, from the viewpoint of avoiding excessive bulk in the magnetic fluid drive unit, the wall thickness of the outer tube may be, for example, no greater than 50 mm, no greater than 40 mm, no greater than 30 mm or no greater than 20 mm.

The inner tube preferably has the high heat conducting region and the low heat conducting region, described below, formed on the inner side, to constitute the flow path for the heating medium. Thus, from the viewpoint of ensuring the cross-sectional area as a flow path for the heating medium even after the high heat conducting region and the low heat conducting region have been formed, the outer diameter of the inner tube may be, for example, 50 mm or greater, 60 mm or greater, 70 mm or greater, 80 mm or greater or 100 mm or greater. On the other hand, from the viewpoint of sufficiently widening the gap with the inner wall of the outer tube to ensure the cross-sectional area for the flow path of the magnetic fluid, the outer diameter of the inner tube may be, for example, no greater than 180 mm, no greater than 170 mm, no greater than 160 mm or no greater than 150 mm.

From the viewpoint of ensuring that the inner tube exhibits strength that can withstand distribution of the magnetic fluid and heating medium, the wall thickness may be, for example, 1 mm or greater, 2 mm or greater, 3 mm or greater or 5 mm or greater. On the other hand, from the viewpoint of avoiding transfer of the heat of the heating medium to the magnetic fluid in the high heat conducting region, the wall thickness of the inner tube may be, for example, no greater than 50 mm, no greater than 40 mm, no greater than 30 mm or no greater than 20 mm.

In the magnetic fluid drive unit of the embodiment, the region between the inner tube and the outer tube of the double tube constitutes the flow path for the magnetic fluid.

The inner tube of the double tube has a high heat conducting region and a low heat conducting region aligned in the lengthwise direction of the inner tube, inside the region where the magnetic field is applied by the magnetic field applicator. Here, the phrase "aligned in the lengthwise direction" means that the high heat conducting region and the low heat conducting region are situated along the axial direction of the inner tube, preferably with both in contact with each other. Both regions are preferably situated in mutual contact because this will maximize the driving force generated by the disproportion between the magnetic volume forces F1 and F2.

The material composing the high heat conducting region is preferably a high thermal conductive material having a thermal conductivity of 100 W/m·K or greater, 150 W/m·K or greater or 200 W/m·K or greater at 20° C. Such high thermal conductive materials include, for example, metal materials, and specifically, they may be appropriately selected from among gold, silver, copper, aluminum and stainless steel.

The high heat conducting region functions to transfer as much of the heat of the heating medium as possible to a portion of the magnetic fluid that is subjected to the applied magnetic field. Thus, the high heat conducting region must be of significant length, and may be 50 mm or longer, 100 mm or longer, 120 mm or longer or 150 mm or longer, for example. On the other hand, from the viewpoint of ensuring establishment of a low heat conducting region in a part of the region where the magnetic field is applied, the length of the high heat conducting region may be 500 mm or shorter, 400 mm or shorter, 300 mm or shorter or 250 mm or shorter, for example.

The material composing the low heat conducting region is preferably a low thermal conductive material having a thermal conductivity of 0.5 W/m·K or lower, 0.1 W/m·K or lower or 0.05 W/m·K or lower at 20° C. The low thermal conductive material may be a non-metal material, for example, and specifically the material may be appropriately selected from among glass wool, rock wool, foamed plastic and ligneous fiber-based heat-insulating materials.

The low heat conducting region may consist entirely of the aforementioned low thermal conductive material, or that region may be composed of a thin hollow structural material filled with the aforementioned low thermal conductive material. The structural material in this case may be either a high thermal conductive material or a low thermal conductive material, but a preferred mode for the embodiment is a structural material filled with a low thermal conductive material, so long as the material exhibits low thermal conductivity overall.

The low heat conducting region functions to prevent as much as possible any transfer of the heat of the heating medium to the portion of the magnetic fluid that is subjected to the applied magnetic field. Thus, the low heat conducting region must be of significant length, and may be 50 mm or longer, 100 mm or longer, 120 mm or longer or 150 mm or longer, for example. On the other hand, from the viewpoint of ensuring establishment of a high heat conducting region in a part of the region where the magnetic field is applied, the length of the low heat conducting region may be 500 mm or shorter, 400 mm or shorter, 300 mm or shorter or 250 mm or shorter, for example.

The high heat conducting region and low heat conducting region may be configured so that their entire regions are subjected to a magnetic field by the magnetic field applicator described below, or they may be configured so that only portions of each of the high heat conducting region and the low heat conducting region are subjected to the magnetic field. However, the high heat conducting region and low heat conducting region are preferably configured so that a significant length of each is within the magnetic field-applied region. For the high heat conducting region and the low heat conducting region, the length of the region within the magnetic field-applied region may each be, for example, 50 mm or longer, 60 mm or longer, 70 mm or longer or 80 mm or longer, and 150 mm or shorter, 140 mm or shorter, 130 mm or shorter or 120 mm or shorter.

The inner tube of the double tube may have the high heat conducting region and the low heat conducting region on the inner side or on the outer side of the inner tube. A mode having one of these regions on the inner side of the inner tube and the other on the outer side of the inner tube is also allowable.

However, selection of the placement of these regions is preferably made in consideration of maintaining as smooth a flow path as possible for the magnetic fluid and the need to eliminate as much as possible the possibility of blocking driving of the magnetic fluid. In other words, if either or both the high heat conducting region and low heat conducting region is situated on the magnetic fluid flow path side (the outer side of the inner tube), then level differences or irregularities will be produced in the magnetic fluid flow path, potentially creating an obstacle against driving of the magnetic fluid. Therefore, preferably both the high heat conducting region and low heat conducting region are configured on the inner side of the inner tube.

The high heat conducting region and low heat conducting region may have prescribed thicknesses to effectively exhibit their respective intended functions.

The high heat conducting region is preferably as thin as possible from the viewpoint of transferring the heat of the heating medium to the magnetic fluid with maximum efficiency. On the other hand, the low thermal conductivity region is preferably as thick as possible from the viewpoint of maximally blocking the heat of the heating medium. When the inner tube has the high heat conducting region and the low heat conducting region on its inner side, the inner sides of those regions serve as flow paths for the heating medium. Thus, from the viewpoint of interference with flow of the heating medium and preventing disturbance or stagnation of the flow, the preferred mode is one with no level differences or irregularities in the flow path of the heating medium.

Considering these factors in general, it is desirable to set the thicknesses such as to avoid creating a level difference in the flow path by the configuration of the high heat conducting region and low heat conducting region, in order to avoid impeding flow of the heating medium, and to achieve both conduction of heat in the high heat conducting region and blocking of heat in the low heat conducting region. From this viewpoint, the thicknesses of the high heat conducting region and the low heat conducting region may each be, for example, 30 mm or greater, 50 mm or greater or 75 mm or greater, and for example, no greater than 150 mm, no greater than 120 mm or no greater than 100 mm, and the thicknesses of both regions may also be approximately equal.

[Magnetic Field Applicator]

The magnetic field applicator may be a magnet that is disposed on the outer side of the double tube and is capable of applying a magnetic field to the double tube (especially the magnetic fluid in the flow path). The distribution of the applied magnetic field is ideally an approximately trapezoid magnetic field distribution without polar reversal across the entire region in which the magnetic field is applied.

The magnet composing the magnetic field applicator may be either an electromagnet or a permanent magnet.

An electromagnet may be a solenoid coil, for example. Using an electromagnet as the magnetic field applicator is preferred to allow easy formation of an approximately trapezoid magnetic field distribution without polar reversal across the entire region in which the magnetic field is applied.

The permanent magnet may be, for example, an anisotropic radial ring-type permanent magnet. The material of the permanent magnet may be one such as a neodymium magnet, a samarium cobalt magnet or a ferrite magnet. Preferred among these is a neodymium magnet, which has high magnetic force and can generate a high magnetic field.

Using a permanent magnet as the magnetic field applicator is preferred for certain advantages, in that it does not require an electric power unit for application of the magnetic field and allows the device to be downsized, as well as for energy efficiency. It is particularly preferred to use a permanent magnet for the magnetic field applicator if waste heat is to be utilized as a heating medium, as driving of the magnetic fluid can be accomplished without consumption of additional energy.

Since the heat source is inside the inner tube in the configuration of this embodiment, the distance between the magnetic field applicator and the heat source is longer at least by the amount of interposition of the outer tube and magnetic fluid. Therefore, the embodiment provides an advantage in that the magnetic field formed by the magnetic field applicator is less affected by heat from the heat source, thereby facilitating control of driving of the magnetic fluid.

The length of the magnetic field applicator may be, for example, 50 mm or longer, 100 mm or longer, 120 mm or longer or 150 mm or longer, and for example, 500 mm or shorter, 400 mm or shorter, 300 mm or shorter or 250 mm or shorter.

[Optional Components]

When the magnetic fluid drive unit of the embodiment employs an electromagnet as the magnetic field applicator in addition to the aforementioned double tube and magnetic field applicator, the unit may also have an electric power unit and a controller for the electromagnet.

The magnetic fluid drive unit of the embodiment may also optionally have a temperature measuring thermocouple, a magnetic fluid flow rate meter, a heating medium flow rate meter, a pump or blower for distribution of the heating medium, and auxiliary heating means and auxiliary cooling means for appropriate adjustment of the temperature of the magnetic fluid flowing into the apparatus.

[Magnetic Fluid]

The magnetic fluid to be used for the embodiment comprises magnetic fine particles and a mother liquor containing the magnetic fine particles in a dispersed state, and the magnetic fluid may optionally further comprise a low-boiling-point solvent with a lower boiling point than the mother liquor.

The magnetic fine particles may be, for example, iron oxide-based fine particles or spinel ferrite ($MFe_2O_4$, M=Fe, Mn, Ni, or $Mn_xZn_{1-x}$ (0<x<1)), γ-hematite (γ-$Fe2O_3$). Particularly preferred is manganese zinc ferrite ($Mn_xZn_{1-x}Fe_2O_4$, 0<x<1). Manganese zinc ferrite has high magnetization in the ordinary temperature range and high temperature dependence of magnetization, while control of the composition allows the Curie temperature to be appropriately adjusted, making this material suitable as a component for the magnetic fluid of the embodiment.

Examples for the mother liquor include water, hydrocarbon-based oils (for example, kerosene or alkylnaphthalene), and fluorine-based oils (for example, perfluoropolyether).

A low-boiling-point solvent may be appropriately selected from among solvents with lower boiling points than the mother liquor, in consideration of compatibility with the mother liquor. For example, when the mother liquor is a hydrocarbon-based oil (for example, kerosene), it may be suitable to use a hydrocarbon compound with a lower boiling point than the hydrocarbon-based oil (for example, pentane, hexane or octane). The mixing ratio of the low-boiling-point solvent and the mother liquor may be appropriately determined in consideration of the thermomagnetic and other properties of the magnetic fluid that is to be obtained.

A distributable configuration for the magnetic fluid between the inner tube and the outer tube is a configuration with a magnetic fluid inlet and a magnetic fluid outlet provided in the flow path of the magnetic fluid (that is, between the inner tube and outer tube of the double tube), and with the magnetic fluid inside the flow path in a state that does not block flow when the magnetic fluid flows by itself. A preferred mode of the embodiment is to connect the magnetic fluid inlet and magnetic fluid outlet via an exterior flow path to allow the magnetic fluid to circulate.

[Application of Magnetic Field]

In this embodiment in which a magnetic fluid is to be driven, the magnetic field is applied by the magnetic field applicator onto the magnetic fluid that is disposed between the inner tube and the outer tube of the double tube.

The strength of the applied magnetic field may be appropriately determined by a person skilled in the art in overall consideration of the cross-sectional area of the magnetic fluid flow path and the temperature and desired flow rate of the heating medium.

[Heating Medium]

As mentioned above, the magnetic fluid is disposed between the inner tube and the outer tube of the double tube in a distributable manner, with a magnetic field applied by the magnetic field applicator, and the heating medium being distributed on the inner side of the inner tube, thereby allowing the magnetic fluid to be driven.

The heating medium used is preferably one in a flowable form, and for example, the heating medium may be a gas, a liquid, or a mixture thereof. Examples of gases include air, steam, ammonia, freon gas and carbon dioxide. Examples of liquids include water, brine, oil and Dowtherm $A^R$.

The heating medium used for this embodiment may be any of the aforementioned materials that have been heated. From the viewpoint of effective utilization of the previously discarded heat, however, the heating medium used is preferably, for example, exhaust gas discharged from an internal combustion engine, exhaust gas discharged from a boiler, or hot water discharged from a factory installation. Exhaust gas discharged from an internal combustion engine is particularly preferred for its ready availability, high emission and high temperature.

The temperature of the heating medium may be, for example, 50° C., 75° C. or higher, 100° C. or higher, 150° C. or higher or 200° C. or higher; and for example, 1,000° C. or lower, 800° C. or lower, 600° C. or lower, 500° C. or lower or 400° C. or lower.

The distribution rate of the heating medium may be appropriately determined by a person skilled in the art in overall consideration of the form of the heating medium (gaseous or liquid) and its temperature, as well as the cross-sectional area of the magnetic fluid flow path and the desired flow rate. For expected use as a heating medium, the distribution rate may be, for example, 100 L/min or higher, 200 L/min or higher, 300 L/min or higher or 500 L/min or higher; and 1,500 L/min or lower, 1,200 L/min or lower, 1,000 L/min or lower or 800 L/min or lower.

<Heat Transport Method>

The method used to drive the magnetic fluid of this embodiment may be a heat transport method in which the magnetic fluid is driven to transport the heat of the heating medium to a different location. That is, in the method of driving a magnetic fluid according to this embodiment, at least a portion of the heat of the heating medium is transferred to the magnetic fluid, thereby allowing the magnetic fluid to be driven to transport the heat of the heating medium to a different location together with the magnetic fluid.

The heat that has been transported by the method of driving a magnetic fluid according to this embodiment may be utilized as a heat source for heating, for example.

EXAMPLES

<Experiment Apparatus>

Figure 3:
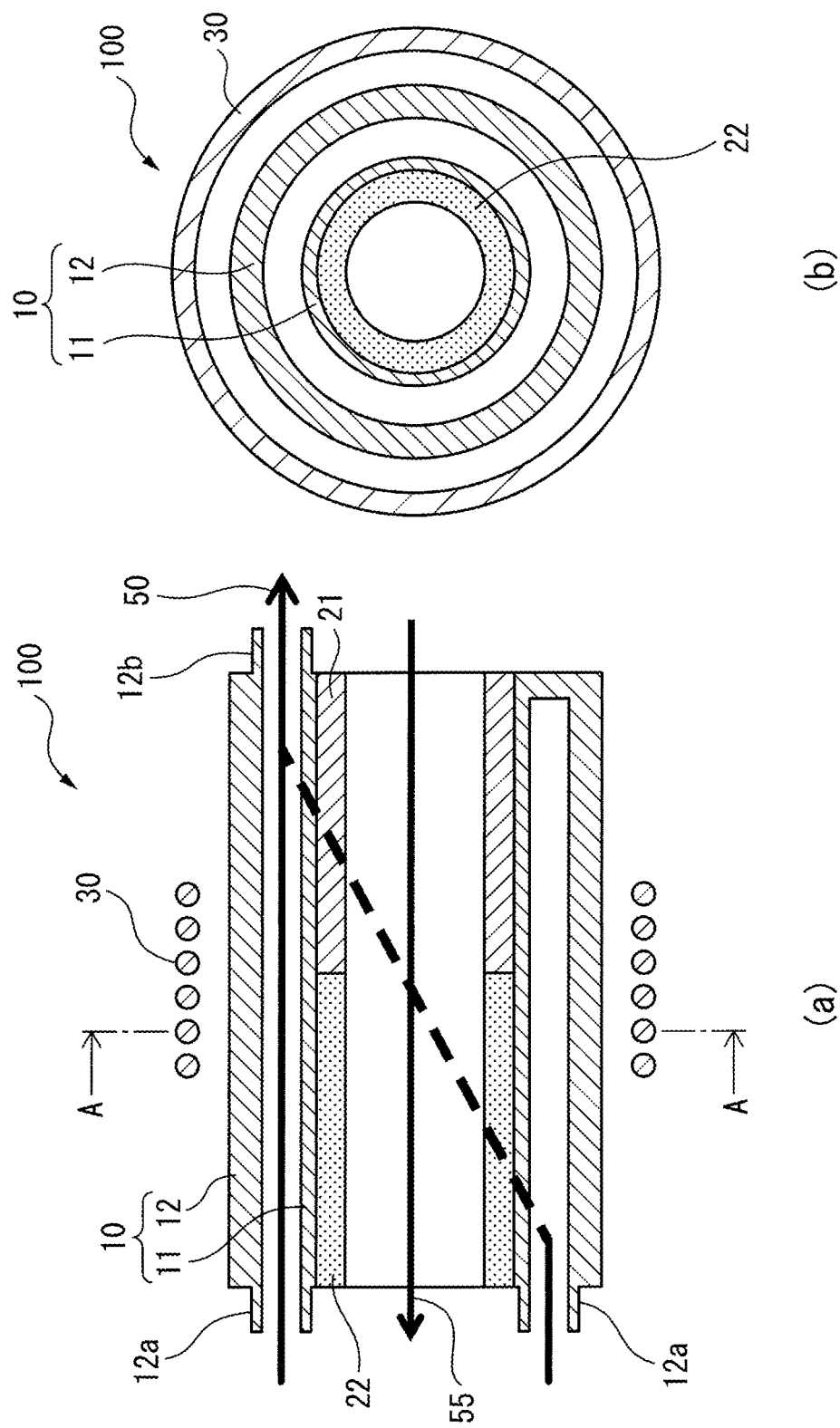
FIG. 3 is a simplified cross-sectional view for illustration of the structure of the magnetic fluid drive unit used in the examples.
Figure 4:
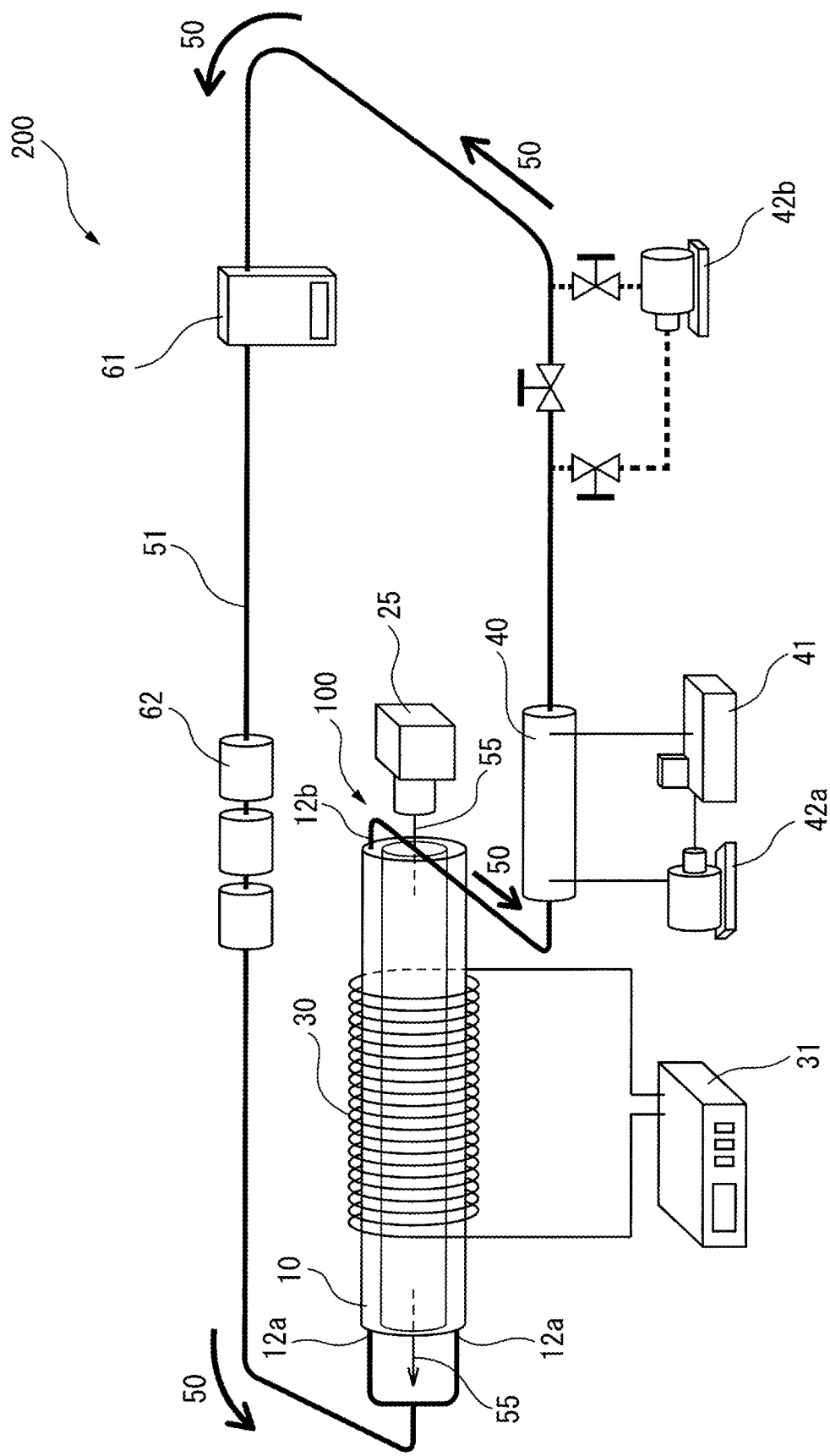
FIG. 4 is a simplified perspective view showing an overview of the magnetic fluid driving system used in the examples.

Prototypes of the magnetic fluid drive unit shown in FIG. 3 and the magnetic fluid driving system shown in FIG. 4 were constructed for a magnetic fluid driving test.

FIG. 3 is a simplified cross-sectional view showing the construction of a magnetic fluid drive unit. FIG. 3(*a*) is a cross-sectional view of the magnetic fluid drive unit 100 cut on a face parallel to the central axis, and FIG. 3(*b*) is a cross-sectional view along line A-A in FIG. 3(*a*).

The magnetic fluid drive unit 100 shown in FIG. 3 has:
a magnetic field applicator 30 with a length of 200 mm wherein the unit length coil count of the solenoid coil is n=10,000 coils/m,
on the outer side of a brass double tube 10 having an inner tube 11 with an outer diameter of 120 mm and an inner diameter of 110 mm, and an outer tube 12 with an outer diameter of 150 mm and an inner diameter of 140 mm.

The full length of the magnetic fluid drive unit 100 in FIG. 3 is 400 mm.

In the magnetic fluid drive unit 100 of FIG. 3, the gap between the inner tube 11 and the outer tube 12 has two magnetic fluid inlets 12*a* at one end of the drive unit 100 (the left end in FIG. 3), and one magnetic fluid outlet 12*b* at the opposite end (the right end in FIG. 3), thereby allowing distribution of the magnetic fluid as indicated by the arrow 50.

On the inner side of the inner tube 11 of the magnetic fluid drive unit 100 there are aligned, along the flow path 51 of the magnetic fluid, a tubular high heat conducting region 21 (upstream flow path, length: 200 mm) and a tubular low heat conducting region 22 (downstream flow path, length: 200 mm), both being connected while bordering the center in the lengthwise direction of the magnetic field applicator 30.

The high heat conducting region 21 is made of copper. The low heat conducting region 22 is a hollow copper member filled with a heat-insulating material (glass wool). The thicknesses of the walls of the tubular high heat conducting region 21 and the tubular low heat conducting region 22 are each 10 mm, an 83 mm diameter hollow section being maintained in the inner side of the inner tube 11, allowing the heating medium to flow in the direction indicated by the arrow 55.

FIG. 4 is a simplified perspective view showing the entire magnetic fluid driving system 200 including the magnetic fluid drive unit 100 of FIG. 3.

In the magnetic fluid driving system 200, the two magnetic fluid inlets 12a and the one magnetic fluid outlet 12b of the magnetic fluid drive unit 100 are composed of flow paths 51 connected via an exterior flow path, allowing circulation of the magnetic fluid. The full length of the flow path 51 is 5 m.

In the heating medium flow path of the magnetic fluid drive unit 100 there is disposed a hot air blower 25 that serves to convey hot air as a heating medium in the direction indicated by the arrow 55.

In the flow path 51 of the magnetic fluid there are installed a cooler 40, a circulator 41, a pump 42a and an auxiliary heater 62, allowing temperature adjustment when the magnetic fluid flows into the drive unit 100. The flow rate of the magnetic fluid can be measured with a flow meter 61. The cooler 40 has a double tube structure, and functions as a countercurrent-type heat exchanger with an inner diameter of 35 mm, an outer diameter of 89 mm, an inner tube length of 500 mm and an outer tube length of 600 mm.

A pump 42b is further provided in the flow path 51 of the magnetic fluid, as a design to facilitate temperature adjustment of the magnetic fluid at the initial stage until driving of the magnetic fluid reaches a steady state. In addition, a pressure gauge, a temperature recorder and a computer (none of which are shown) are also placed in the flow path 51 of the magnetic fluid, to allow control and recording of the various parameters.

Example 1

The magnetic fluid used was a mixture of 80 mass % of the kerosene-based temperature-sensitive magnetic fluid TS-50K (trade name of Ichinen Chemicals Co., Ltd., Curie temperature: 528K) and 20 mass % of n-hexane (product of Wako Pure Chemical Industries, Ltd.). The heating medium used was hot air at temperature of 360° C. and a flow rate of 570 L/min, generated from a hot air blower 25. The applied magnetic field strength was 63.4 mT.

The magnetic fluid was filled into the magnetic fluid drive unit 100, and the magnetic fluid was forcefully driven with the pump 42b in the direction matching the driving direction of the magnetic fluid at steady state (the direction of the arrow 50), to remove the air bubbles in the experiment apparatus. Next, forceful driving was continued with the pump 42b until the temperature of the magnetic fluid at the magnetic fluid inlet 12a of the drive unit 100 stabilized at a constant temperature of 25.0° C.

After confirming stabilization of the inlet temperature of the magnetic fluid, magnetic field application was initiated with the magnetic field applicator 30 (solenoid coil), and the pump 42b was blocked from the flow path 51 while supply of hot air by the hot air blower 25 was initiated to begin a magnetic fluid autocirculation experiment.

After approximately 1000 seconds from starting the hot air supply, autocirculation of the magnetic fluid was initiated in the direction indicated by the arrow 50 in FIG. 4.

Figure 5:
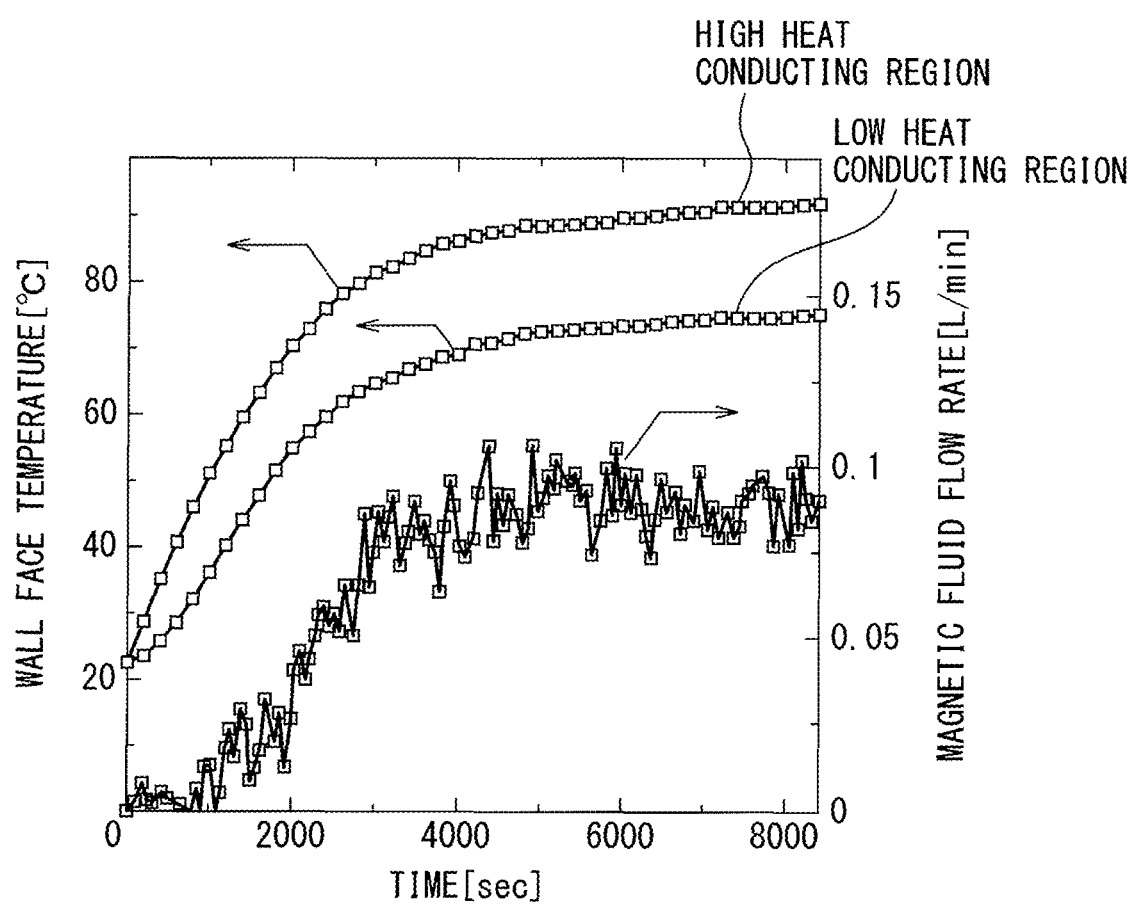
FIG. 5 is a graph showing the relationship between wall face temperature and magnetic fluid driving speed inside the magnetic fluid drive unit, and elapsed time, for the examples.

FIG. 5 shows the time-dependent changes in the temperature of the inner side wall face of the magnetic fluid flow path in the magnetic fluid drive unit 100 (that is, the wall face temperature on the outer side of the inner tube) and the magnetic fluid flow rate, during the autocirculation experiment. The point at time=0 seconds on the abscissa of FIG. 5 is the point where hot air supply was initiated with the hot air blower 25.

Referring to FIG. 5, in both the high heat conducting region 21 and the low heat conducting region 22, the temperature of the inner side wall face of the magnetic fluid flow path in the magnetic fluid drive unit 100 gradually increased from the start of hot air supply until approximately 5000 seconds elapsed, with a gentle temperature increase rate thereafter.

Figure 6:
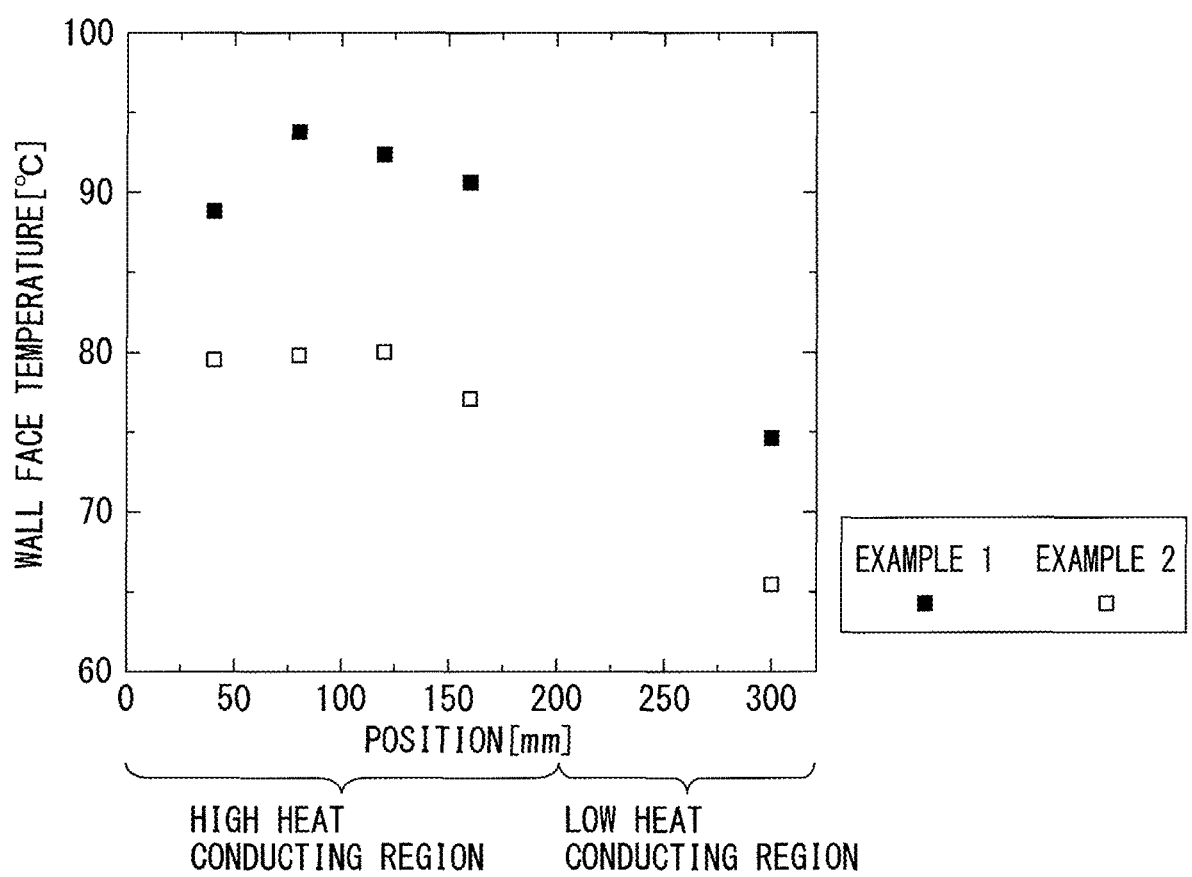
FIG. 6 is a graph showing the temperature at each location of the magnetic fluid drive unit for the examples.

Table 1 shows the maximum wall face temperature of the high heat conducting region 21, and the wall face temperature difference and the magnetic fluid flow rate in the high heat conducting region 21 and the low heat conducting region 22 at that time, as well as the heat recovery volume in the magnetic fluid drive unit 100 and cooler 40 (heat exchanger), as measured for Example 1. Also, FIG. 6 shows a graph representing the location dependency of the wall face temperature of the high heat conducting region 21 at the time of maximum wall face temperature. The point where location=0 mm on the abscissa in FIG. 6 corresponds to the left end in FIG. 3(*a*).

Example 2

A magnetic fluid autocirculation experiment was conducted in the same manner as Example 1, except that the temperature of the hot air supplied by the hot air blower 25 was 310° C. The experimental results are shown in Table 1 and FIG. 5, together with the results of Example 1.

TABLE 1

| | | Magnetic fluid flow path wall face temperature [° C.] | | Magnetic fluid | Heat recovery volume [W] | |
|---|---|---|---|---|---|---|
| | Hot air temperature [° C.] | Maximum in high heat conducting region | Temperature difference between high heat conducting region and low heat conducting region | flow rate [L/min] | Drive unit | Heat exchanger |
| Example 1 | 360 | 94.4 | ~20 | 0.089 | 142.2 | 122.6 |
| Example 2 | 310 | 80.3 | ~15 | 0.077 | 96.8 | 58.0 |

EXPLANATION OF SYMBOLS

10 Double tube
11 Inner tube
12 Outer tube
12a Magnetic fluid entrance
12b Magnetic fluid exit
21 High heat conducting region
22 Low heat conducting region
25 Hot air blower
30 Magnetic field applicator
31 DC Power supply
40 Cooler (heat exchanger)
41 Circulator
42a, 42b Pumps
50 Arrow indicating driving direction of magnetic fluid
51 Magnetic fluid flow path
55 Arrow indicating flow direction of heating medium
61 Flow meter
62 Auxiliary heater
100 Magnetic fluid drive unit
200 Magnetic fluid driving system
C1 Heat supplied to magnetic fluid in high heat conducting region
C2 Heat supplied to magnetic fluid in low heat conducting region
F1 Magnetic volume force in right direction
F2 Magnetic volume force in left direction
H Magnetic field

What is claimed is:

1. A magnetic fluid drive unit having:
    a double tube comprising an inner tube and an outer tube disposed outside of an inner side of the inner tube, and
    a magnetic field applicator installed on the outer side of the double tube,
    the inner tube having, in the region where a magnetic field is applied by the magnetic field applicator, a high heat conducting region and a low heat conducting region aligned in the lengthwise direction of the inner tube, and
    the inside of the inner tube being a heating medium flow path and the area between the inner tube and the outer tube being a magnetic fluid flow path.

2. A method of driving a magnetic fluid using a magnetic fluid drive unit according to claim 1, wherein:
    a magnetic fluid is situated between the inner tube and the outer tube, and
    a magnetic field is applied by the magnetic field applicator while distributing a heating medium on an inner side of the inner tube.

3. The method according to claim 2, wherein the heating medium is an exhaust gas discharged from an internal combustion engine.

4. A heat transport method in which, by driving a magnetic fluid by a method according to claim 2, the heat of the heating medium is transported.

5. A heat transport method in which, by driving a magnetic fluid by a method according to claim 3, the heat of the heating medium is transported.

* * * * *